March 9, 1965 H. E. REICHART 3,172,209
SPOTTING PRESS
Filed June 18, 1962 3 Sheets-Sheet 1

INVENTOR.
HERMAN E. REICHART
BY
Whittemore, Hulbert & Belknap
ATTORNEYS

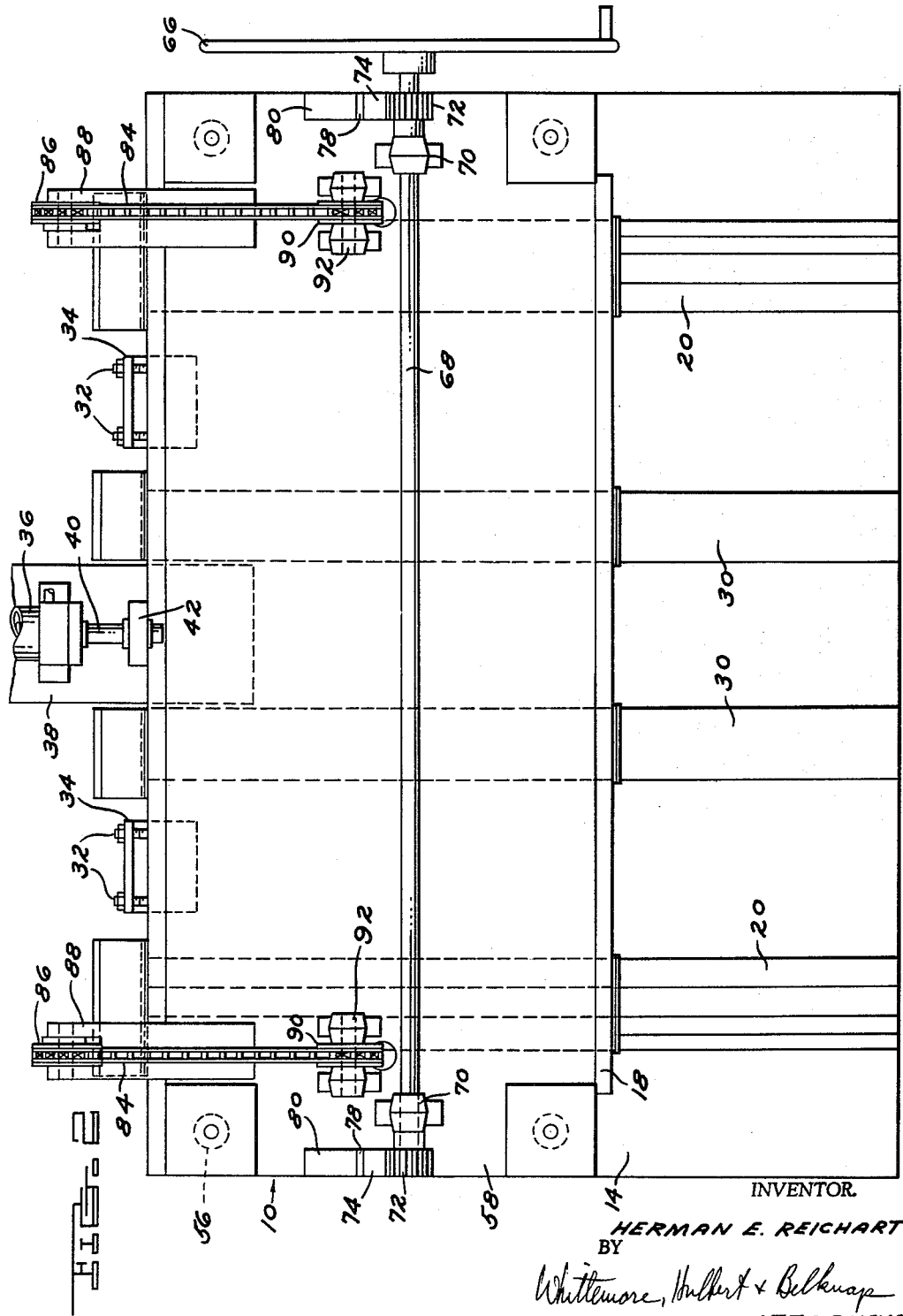

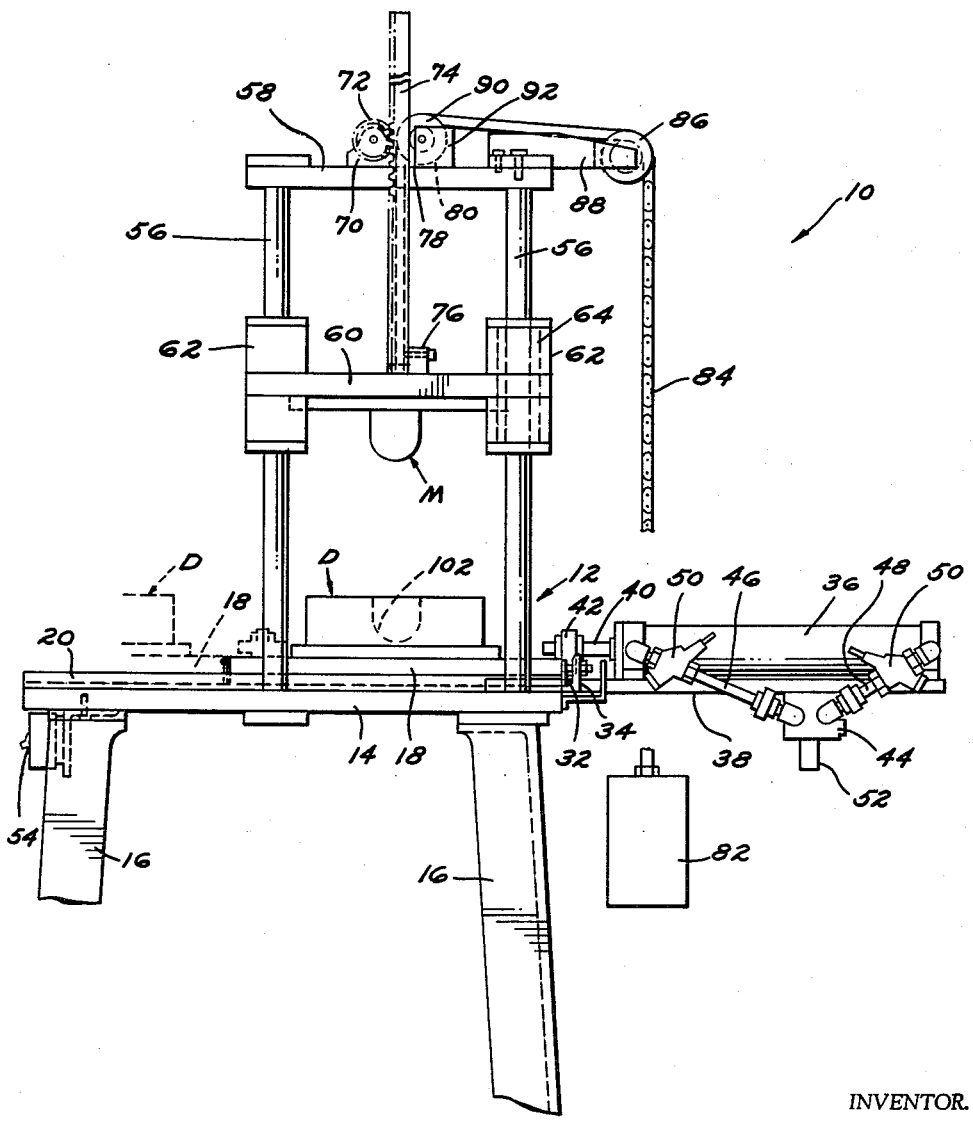

United States Patent Office 3,172,209
Patented Mar. 9, 1965

3,172,209
SPOTTING PRESS
Herman E. Reichart, 2810 W. Long Lake Road,
Bloomfield Hills, Mich.
Filed June 18, 1962, Ser. No. 203,353
2 Claims. (Cl. 33—174)

This invention relates generally to the manufacture of dies, and refers more particularly to a spotting press.

In making a die for use in the manufacture of articles such as trim molding strips for automobiles, a female plastic mold or die is first made from the model master. A male plastic replica of the model master is then made from the female plastic mold. A metal female die, or Keller die, is made on a duplicating machine from the female plastic die. The Keller die is a close approximation, although not an exact replica, of the female plastic die. Thereafter, the Keller die is spotted with the male plastic replica to provide a finished die exactly complementary in shape and form to the model master.

The press of this invention is designed to do the spotting which heretofore has been done manually. Accordingly, one object of the invention is to provide a press which will carry out the spotting operation faster and with greater accuracy than has been possible in the past.

Another object is to provide a spotting press comprising a platen adapted to carry the plastic replica or model and guided on the press frame for up and down reciprocation, and a table adapted to carry the die to be spotted guided on the frame for lateral movement from an operative position directly beneath the platen to an inoperative position spaced to one side of the operative position. The die in the inoperative position of the table is clear of the platen and readily accessible to the operator for grinding high spots. Moreover, the die as well as the operator are in a safe position in the event the platen should be operated inadvertently during grinding.

Another object is to provide a spotting press wherein the table is guided for horizontal movement and in its operative position the die will be spotted by the plastic model when the platen moves in a downward direction, and wherein the die is clear of the path of vertical movement of the model when the table is moved to its inoperative position.

Another object is to provide a spotting press wherein means are provided for mounting the plastic model and the die in adjusted position such that the die will be accurately spotted during operation of the press.

Another object is to provide a counterweight for the platen so that the plastic model will not be subjected to undue pressure during the spotting operation.

Other objects and features of the invention will become apparent as the description proceeds, especially when taken in conjunction with the accompanying drawings, wherein:

FIGURE 2 is a top plan view of the spotting press shown in FIGURE 1.

FIGURE 3 is a side elevational view.

Figure 1:
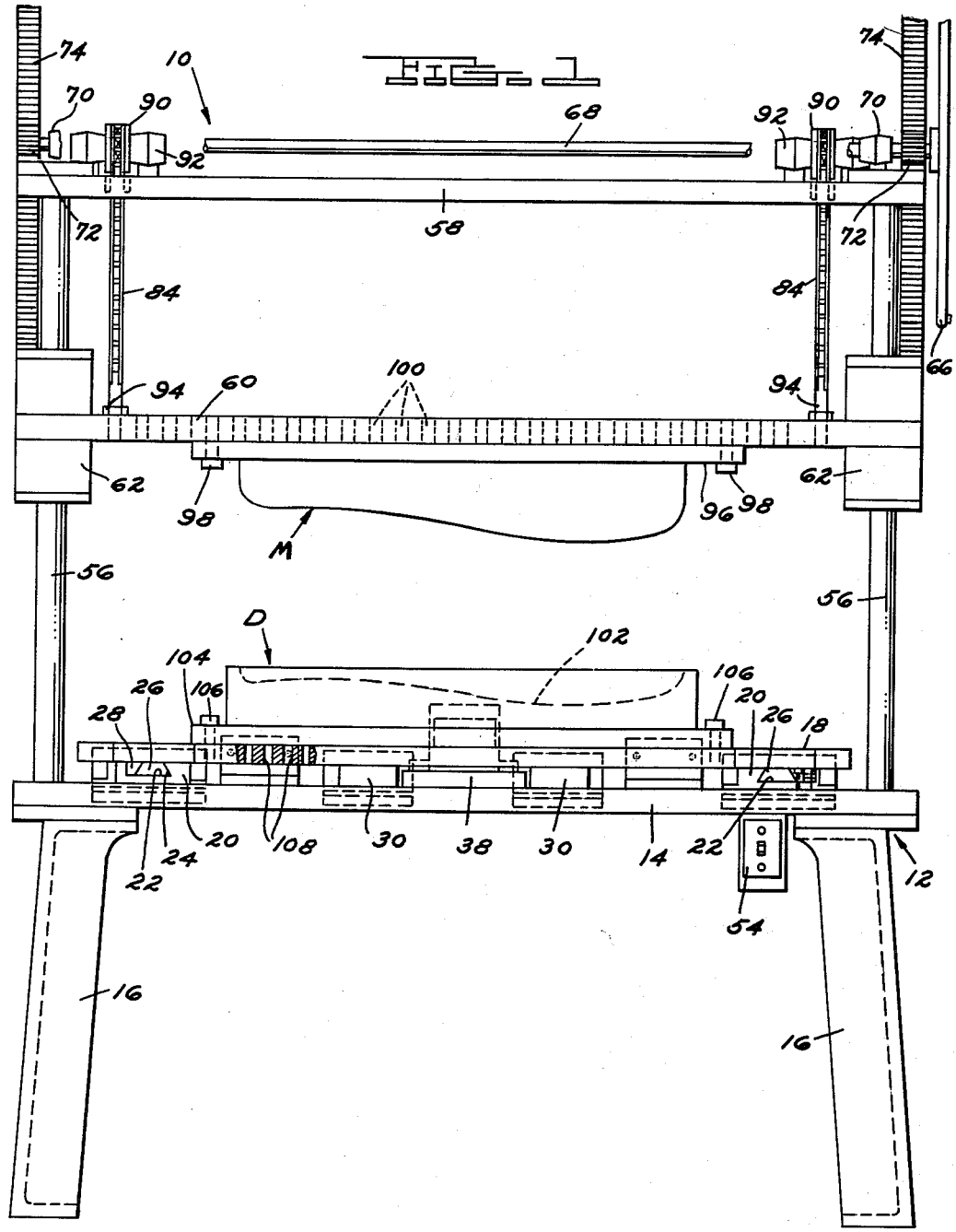
FIGURE 1 is a front elevational view of a spotting press embodying my invention.

The spotting of a die has heretofore been done manually. The operator coats the plastic model or replica with a dye and places the model in the cavity of the die. The high spots in the die will contact the model and be colored by the dye on the model. Usually the dye will be of a bright color contrasting with the color of the Keller die. The operator then grinds away the marked or dyed surface of the die, and again inserts the plastic model. This spotting continues, and each time the operator grinds down the surface of the die where the spots of the dye leave marks. Eventually, the entire surface of the die will be touched and coated by the dye on the plastic model indicating that the die has been formed to the final desired configuration.

The press of this invention is designed to carry out the spotting operation and is generally indicated at 10 in the drawings. The press has a frame 12 which includes a horizontal bed or base support 14 mounted on legs 16. A horizontal plate or table 18 is mounted on the base support 14 for horizontal sliding movement from an operative position shown in solid lines in FIGURE 3 to an inoperative position shown partially in dotted lines in that figure.

The table 18 is guided in its movement between operative and inoperative positions by the guides 20 secured to the top surface of the base support in laterally spaced parallel relation. The guides 20 have grooves 22 in their top surfaces which extend for the full length of the guides and are undercut along one side as indicated at 24. The table 18 has elongated parallel ribs 26 on its under surface in positions to fit in the undercut grooves 22, and retainer bars 28 are fixed in the grooves to retain the ribs. It will be noted that the ribs are dovetailed and that the retainer bars are undercut along one side to cooperate with the undercut grooves in preventing the ribs from lifting out. The base support 14 also carries a pair of rails 30 which support the intermediate portions of the table.

The table is located in its operative position shown in solid lines in FIGURE 3 by the stop screws 32, which are carried by angle brackets 34 secured to the rear end of the base support 14. The screws 32 thread through the upright flanges of the angle brackets 34 and are adjustable longitudinally by rotation to determine with accuracy the desired location of the table when in operative position. The ends of the screws engage the rear end of the table.

The table is reciprocated forwardly and rearwardly between its inoperative and operative positions by the air cylinder 36 secured to the base support 14 by a plate 38. The piston (not shown) within the cylinder is connected to the rod 40 which in turn is connected to the rear end of the table by the coupling 42. The forward limit of movement of the piston determines the forward or inoperaitve position of the table shown in dotted lines in FIGURE 3. A four-way valve 44 is provided for supplying air under pressure to the rod end of the cylinder through conduit 46 while exhausting the head end of the cylinder through conduit 48, and alternately supplying air under pressure to the head end of the cylinder through conduit 48 while exhausting the rod end through conduit 46. Manually adjustable flow control valves are provided in the conduits 46 and 48 to control the rate of movement of the piston. The valve 44 is controlled by a solenoid 52 which, when energized, positions the valve to deliver air under pressure to the rod end of the cylinder through conduit 46 and when de-energized positions the valve to deliver air under pressure to the head end of the cylinder through conduit 48. Obviously, the operation of the solenoid could be reversed so that upon energization the valve would be positioned to deliver air under pressure to the head end of the cylinder. A switch 54 is mounted on the front of the press frame to energize and de-energize the solenoid through a suitable electric circuit, not shown.

The press frame 10 also includes four vertical guide rods 56 which are secured at their lower ends to the base support 14 and extend upwardly therefrom. The upper ends of the rods 56 are connected together by a plate 58. A horizontal plate or platen 60 is carried by the rods for vertical movement between an upper position illustrated in FIGURES 1 and 3 and a lower position adjacent to the table. As seen in FIGURES 1 and 3, sleeves 62 are carried by the rods 56 and the corners of the platen are rigidly connected to the sleeves. The sleeves have bushings 64 which encircle the rods 56 and enable the sleeves to move freely up and down.

The platen is manually raised and lowered by means of a hand wheel 66, the hand wheel being secured on one end of a shaft 68 mounted for rotation on the plate 58 in journals 70. The shaft 68 has pinions 72 on the ends respectively in mesh with racks 74 which extend upwardly from either side of the platen. The racks are secured at their lower ends to the platen by fastening devices 76 and are held in mesh with the pinions by wear strips 78 carried by blocks 80 secured to plate 58. Rotation of the shaft 68 by the hand wheel in one direction or the other will thus raise or lower the platen.

A counterweight 82 is provided to nearly balance the weight of the platen and associated structure which moves with the platen including the sleeves 62, racks 74, and the plastic model carried by the platen and described more fully hereinafter. The counterweight is suspended by chains or cables 84 extending from the counterweight over sprockets 86 carried by brackets 88 mounted on plate 58, and over sprockets 90 mounted by brackets 92 on plate 58. The opposite ends of the cables or chains 84 are fixed to platen 60 by the fastening devices 94.

The letter M designates the plastic model which is rigidly secured to a mounting plate 96. Bolts 98 are provided to secure the mounting plate to the underside of the platen. It will be noted that the platen is formed with a large number of holes 100 for the reception of the bolts 98 so that the model M may be located in exactly the desired position.

The letter D designates the Keller die which has a cavity 102 approximately complementary in shape with the model M. The die D is secured to a mounting plate 104 which is attached to the upper surface of table 18 by bolts 106. The table has a great many holes 108 for the reception of the bolts 106 so that the mounting plate may be secured to the table in the desired position.

The mounting plates 96 and 104 are secured to the platen and to the table by the bolts provided for this purpose in the desired position so that the model M will be in exact register with the cavity in the die D when the platen is lowered and the table is in the operative position shown in FIGURE 3 directly beneath the platen. Minor adjustments in the mounting of the model or die on its mounting plate may be required to provide exact registration.

After the die and model have been mounted as shown on the table and platen, the hand wheel 66 is operated to lower the platen, causing the model to enter the cavity in the die. The table at this time is of course in its operative position shown in FIGURE 3. For this purpose the operator will have closed the circuit to solenoid 52 by the operation of switch 54, energizing the solenoid to retract table 18 to its operative position against stop screws 32. The model and die will of course have been adjusted for exact registration, that is so that the protruding part of the model registers exactly with the cavity in the die. A certain degree of manual pressure is applied to press the model firmly against the surfaces of the die cavity. There is little danger of damaging the plastic model because of excess pressure because the platen is counterweighted and is operated manually.

The platen is then raised manually by means of the hand wheel, and the model, which carries a coating of a suitable bright-colored dye, will have spotted or marked the surface of the die cavity where contact is made. The marked surfaces of the die cavity indicate high points and must be ground away with a suitable abrasive tool.

To carry out the grinding of the high spots the switch 54 is operated to de-energize the solenoid 52, moving the table 18 by means of cylinder 36 to the dotted line position of FIGURE 3 in which the die cavity is conveniently located for grinding. It would be difficult to grind the marked surfaces of the cavity in the operative position of the table because of the proximity of the platen and supporting bars 56. Moreover, since the table is moved to the side for grinding, the die is clear of the platen. Hence if the platen is inadvertently lowered neither the operator nor the die will be in any danger.

This operation is repeated over and over a great many times, the table being in the solid line position of FIGURE 3 upon descent of the platen to spot the die cavity, and the table being moved to the dotted line position for grinding following elevation of the platen. Eventually the entire surface of the die cavity will be touched and coated with the dye on the plastic model, indicating that the die has been formed to the final desired configuration.

The plastic model may be formed of any suitable material, and while such materials are usually not too strong under impact, the counterweight 62 and manual operation of the platen is sufficient to protect the model from undue pressure. Any suitable dye for the purposes set forth may be employed.

There will be enough friction in the parts so that the platen will remain in any position of elevation when the hand wheel is released by the operator.

What I claim as my invention is:

1. A spotting press comprising a frame having a fixed horizontal bed, two pairs of vertical rods arranged in a rectangle and secured at their lower ends to said bed, one pair of said rods being located at the rear of said bed and in laterally spaced relation on opposite sides thereof, the other pair of said rods being located approximately midway between the front and rear of said bed and in laterally spaced relation on opposite sides thereof, a top plate connecting the upper ends of said rods, a horizontal platen, means mounting a model on the underside of said platen in adjusted position, means on said platen slidably engaging said rods to enable said platen to move vertically up and down with respect thereto, means for moving said platen up and down including two vertical racks secured to said platen at opposite sides thereof and extending upwardly therefrom, one of said racks being located substantially midway between the rods at one side of said bed and the other of said racks being located substantially midway between the rods at the other side of said bed, a shaft, means mounting said shaft for rotation on said top plate near said racks, pinions on said shaft respectively in mesh with said racks, means mounting wear strips on said top plate in positions to contact and support the sides of said racks opposite the sides thereof in mesh with said pinions, means for rotating said shaft, a counterweight for said platen, sprockets on said top plate, chains connected at one end to said platen on opposite sides thereof, the connection of one of said chains to said platen being located substantially midway between the rods at one side of said bed and the connection of the other of said chains to said platen being located substantially midway between the rods at the other side of said bed, said chains extending vertically upward from said connections to said platen and being trained over said sprockets and connected at their opposite ends to said counterweight, laterally spaced, horizontal, parallel tracks on the top surface of said bed extending from the rear of said bed to the front thereof between both pairs of laterally spaced rods, a horizontal table, means mounting a die on the upper surface of said table in adjusted position, means mounting said table on said tracks for movement thereon from a rear operative position directly beneath said platen such that the die thereon can be spotted by the model upon downward movement of said platen to a forward inoperative position over the portion of said bed forward of said rods and platen, adjustable stop means on the rear of said bed engageable with said table to determine the rear operative position thereof, and means for moving said table forwardly and rearwardly including a cylinder mounted on the rear of said bed, a reciprocable piston in said cylinder, and a rod connecting said piston to the rear of said table.

2. A spotting press comprising a frame having a fixed horizontal bed, two pairs of vertical rods arranged in a rectangle and secured at their lower ends to said bed, one pair of said rods being located at the rear of said bed and in laterally spaced relation on opposite sides thereof, the other pair of said rods being located approximately midway between the front and rear of said bed and in laterally spaced relation on opposite sides thereof, a top plate connecting the upper ends of said rods, a horizontal platen, means mounting a model on the underside of said platen in adjusted position, means so said platen slidably engaging said rods to enable said platen to move vertically up and down with respect thereto, means for moving said platen up and down including two vertically extending members secured to said platen and extending upwardly therefrom, one of said members being located substantially midway between the rods at one side of said bed and the other of said members being located susbtantially midway between the rods at the other side of said bed, a shaft, means mounting said shaft for rotation on said top plate, means providing an operative connection between said shaft and said members so that rotation of said shaft will effect a raising or lowering of said platen depending on the direction of shaft rotation, means for rotating said shaft, a counterweight for said platen, rotatable members on said top plate, flexible linear elements connected at one end to said platen on opposite sides thereof, the connection of one of said elements to said platen being located substantially midway between the rods at one side of said bed and the connection of the other of said elements to said platen being located substantially midway between the rods at the other side of said bed, said elements extending vertically upward from said connections to said platen and being trained over said rotatable members and connected to their opposite ends to said counterweight, laterally spaced, horizontal, parallel tracks on the top surface of said bed extending from the rear of said bed to the front thereof between both pairs of laterally spaced rods, a horizontal table, means mounting a die on the upper surface of said table in adjusted position, means mounting said table on said tracks for movement thereon from a rear operative position directly beneath said platen such that the die thereon can be spotted by the model upon downward movement of said platen to a forward inoperative position over the portion of said bed forward of said rods and platen, adjustable stop means on the rear of said bed engageable with said table to determine the rear operative position thereof, and means for moving said table forwardly and rearwardly including a cylinder mounted on the rear of said bed, a reciprocable piston in said cylinder, and a rod connecting said piston to the rear of said table.

References Cited in the file of this patent

UNITED STATES PATENTS

| | | |
|---|---|---|
| 2,727,311 | Aller | Dec. 20, 1955 |
| 2,942,729 | Bowen | June 28, 1960 |
| 3,021,603 | Beeson | Feb. 20, 1962 |
| 3,046,667 | Martineau | July 31, 1962 |
| 3,046,669 | Lasko | July 31, 1962 |

FOREIGN PATENTS

| | | |
|---|---|---|
| 1,088,236 | Germany | Sept. 1, 1960 |